US008856840B2

(12) United States Patent
Nakajima

(10) Patent No.: US 8,856,840 B2
(45) Date of Patent: Oct. 7, 2014

(54) COMMUNICATION SYSTEM, VIDEO SIGNAL TRANSMISSION METHOD, TRANSMITTER, TRANSMITTING METHOD, RECEIVER, AND RECEIVING METHOD

(75) Inventor: Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 1602 days.

(21) Appl. No.: 12/150,493

(22) Filed: Apr. 29, 2008

(65) Prior Publication Data

US 2008/0278567 A1 Nov. 13, 2008

(30) Foreign Application Priority Data

May 11, 2007 (JP) ................................ P2007-127159

(51) Int. Cl.
H04N 9/64 (2006.01)
H04N 7/18 (2006.01)
H04N 21/81 (2011.01)
H04N 21/462 (2011.01)
H04N 5/14 (2006.01)
H04N 7/10 (2006.01)
H04L 12/40 (2006.01)
H04N 21/4363 (2011.01)
H04N 7/20 (2006.01)
H04N 5/44 (2011.01)
H04N 7/00 (2011.01)
H04N 21/41 (2011.01)

(52) U.S. Cl.
CPC ............ *H04N 5/44* (2013.01); *H04N 21/8153* (2013.01); *H04N 21/4622* (2013.01); *H04N 21/4122* (2013.01); *H04N 5/14* (2013.01); *H04N 7/106* (2013.01); *H04L 12/4011* (2013.01); *H04N 21/43637* (2013.01); *H04N 7/20* (2013.01); *H04N 21/43635* (2013.01); *H04N 7/002* (2013.01)
USPC ........................................... 725/81; 348/720

(58) Field of Classification Search
None
See application file for complete search history.

(56) References Cited

U.S. PATENT DOCUMENTS 6,570,606 B1 * 5/2003 Sidhu et al. ................... 348/14.1
6,667,992 B1 * 12/2003 Yanagawa ..................... 370/490

(Continued)

FOREIGN PATENT DOCUMENTS

JP 2002112285 A 4/2002
JP 2003162272 A 6/2003

(Continued)

OTHER PUBLICATIONS

European Search Report EP 08155954, dated Dec. 7, 2010.

(Continued)

*Primary Examiner* — Brian T Pendleton
*Assistant Examiner* — Jonathan V Lewis
(74) *Attorney, Agent, or Firm* — Lerner, David, Littenberg, Krumholz & Mentlik, LLP

(57) ABSTRACT

A communication system includes a transmitter and a receiver. The transmitter includes a video signal outputting unit for outputting an uncompressed video signal of a predetermined content, an identification information generating unit for generating identification information for identifying whether the predetermined content is a still picture content, and a transmitting unit for transmitting wirelessly the video signal outputted from the video signal outputting unit and the identification information generated in the identification information generating unit to the receiver. The receiver includes a receiving unit for receiving the video signal and the identification information transmitted wirelessly from the transmitter, a video signal processor for processing the video signal received in the receiving unit, and a controller for controlling an operation of the video signal processor based on the identification information received in the receiving unit.

17 Claims, 10 Drawing Sheets

CONTROL SEQUENCE CHART

(56) References Cited

U.S. PATENT DOCUMENTS

| | | | |
|---|---|---|---|
| 8,205,236 B2* | 6/2012 | Satoda | 725/90 |
| 2002/0015104 A1* | 2/2002 | Itoh et al. | 348/459 |
| 2002/0099800 A1* | 7/2002 | Brainard et al. | 709/219 |
| 2005/0018775 A1* | 1/2005 | Subramanian et al. | 375/240.25 |
| 2005/0243187 A1* | 11/2005 | Watanabe et al. | 348/231.2 |
| 2006/0209745 A1* | 9/2006 | MacMullan et al. | 370/328 |
| 2007/0240191 A1* | 10/2007 | Singh et al. | 725/81 |
| 2007/0245387 A1* | 10/2007 | Singh et al. | 725/81 |
| 2007/0288980 A1* | 12/2007 | Niu et al. | 725/123 |
| 2008/0134271 A1* | 6/2008 | Qin et al. | 725/118 |
| 2008/0168519 A1* | 7/2008 | Rao et al. | 725/127 |
| 2010/0303158 A1* | 12/2010 | Lin | 375/240.26 |

FOREIGN PATENT DOCUMENTS

| | | | | |
|---|---|---|---|---|
| JP | | 2004271930 A | 9/2004 | |
| JP | | 2005-142709 A | 6/2005 | |
| JP | | 2005151150 A | 6/2005 | |
| JP | | 2006-319503 A | 11/2006 | |
| JP | | 2007-240741 A | 9/2007 | |
| JP | | 2008187536 A | 8/2008 | |
| WO | | 2007023437 A2 | 3/2007 | |
| WO | WO 2007142646 A1 * | | 12/2007 | H04N 7/26 |

OTHER PUBLICATIONS

"High-Definition Multimedia Interface. Specification Version 1.3a" Internet Citation, Nov. 10, 2006, XP 009096686.

Wireless HD Specification Summary, Feb. 2007. http://ewh.ieee.org/r6/scv/ce/meetings/wiHD_Tech_Summary_for_IEEE.pdf.

Office Action from Japanese Application No. 2007-127159, dated May 15, 2012.

* cited by examiner

FIG. 4
TMDS TRANSMISSION DATA STRUCTURE
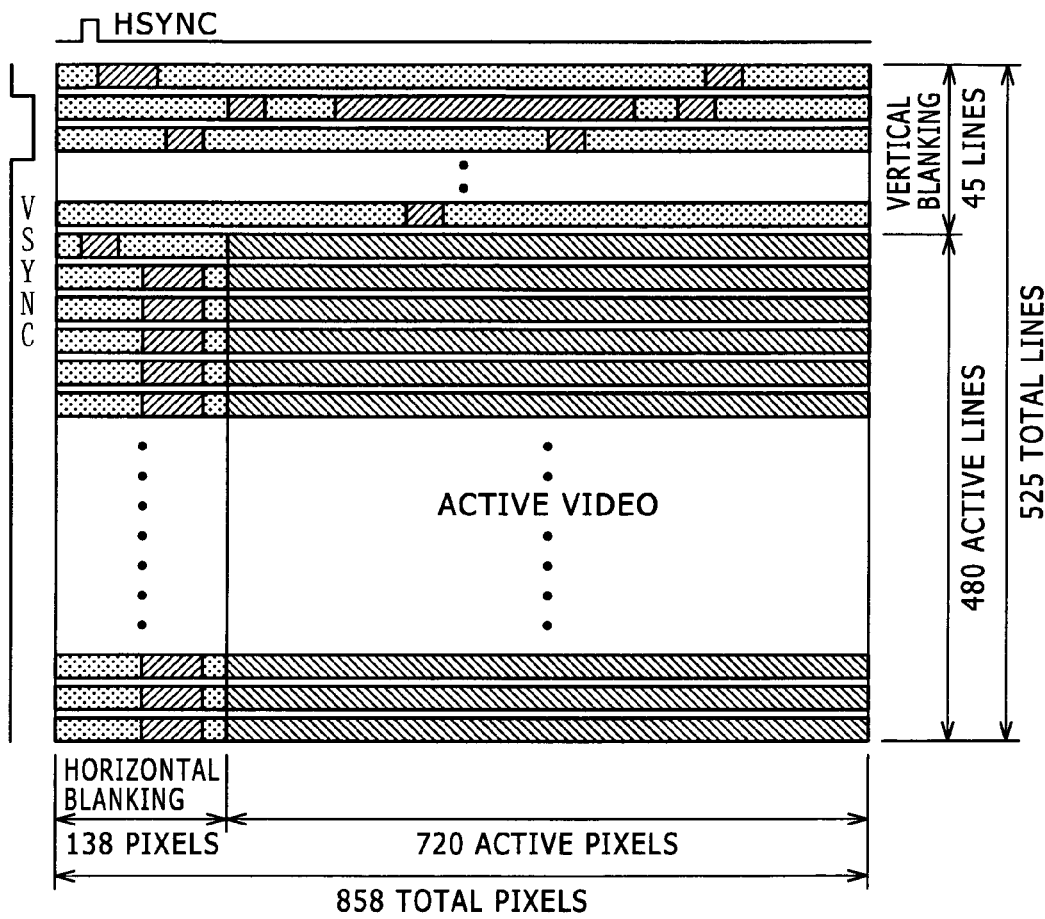
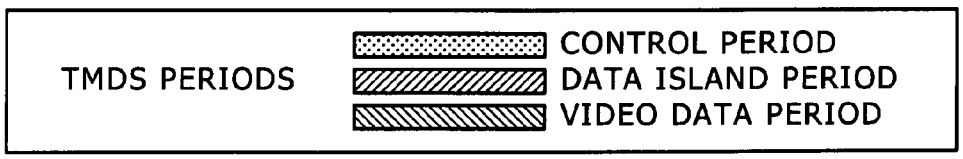

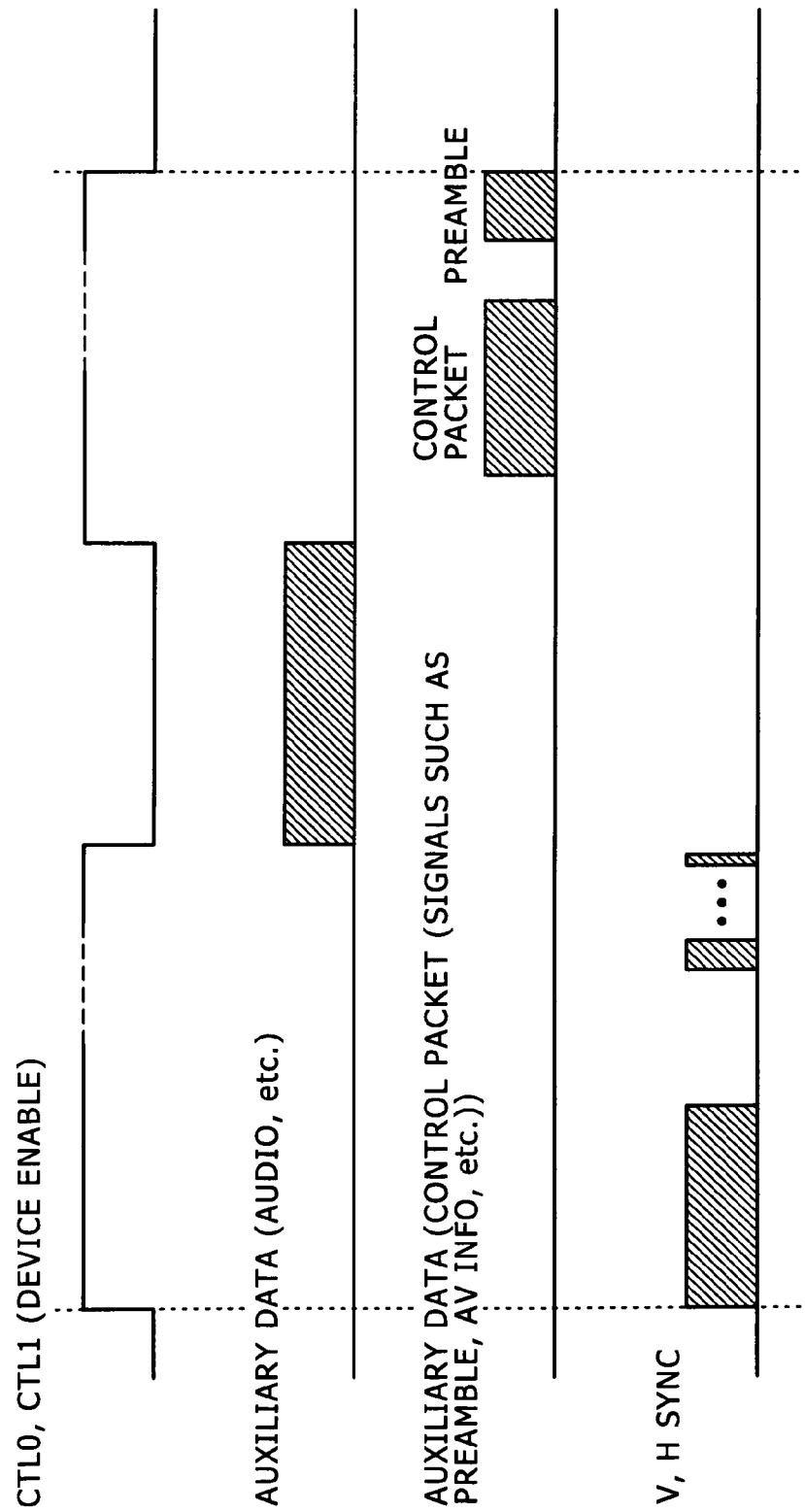

FIG. 6

DATA STRUCTURE OF AVI INFOFRAME PACKET

| | 7 | 6 | 5 | 4 | 3 | 2 | 1 | 0 |
|---|---|---|---|---|---|---|---|---|
| INFOFRAME TYPE CODE | INFOFRAME TYPE = 82₁₆ ||||||||
| INFOFRAME VERSION NUMBER | VERSION ||||||||
| LENGTH OF AVI INFOFRAME | LENGTH OF AVI INFOFRAME (13) ||||||||
| DATA BYTE 1 | RSVD(0) | Y1 | Y0 | A0 | B1 | B0 | S1 | S0 |
| DATA BYTE 2 | C1 | C0 | M1 | M0 | R3 | R2 | R1 | R0 |
| DATA BYTE 3 | ITC | EC2 | EC1 | EC0 | Q1 | Q0 | SC1 | SC0 |
| DATA BYTE 4 | RSVD(0) | VIC6 | VIC5 | VIC4 | VIC3 | VIC2 | VIC1 | VIC0 |
| DATA BYTE 5 | RSVD(0) ||| SPF | PR3 | PR2 | PR1 | PR0 |
| DATA BYTE 6, 7 | LINE NUMBER OF END OF TOP BAR ||||||||
| DATA BYTE 8, 9 | LINE NUMBER OF START OF BOTTOM BAR ||||||||
| DATA BYTE 10, 11 | PIXEL NUMBER OF END OF LEFT BAR ||||||||
| DATA BYTE 12, 13 | PIXEL NUMBER OF START OF RIGHT BAR ||||||||
| DATA BYTE 14, ... 27 | RESERVED (0) ||||||||

CONTROL SEQUENCE CHART

FIG. 9

DATA STRUCTURE DIAGRAM OF AVC CONTROL/MESSAGE PACKET

| BYTE# | 7 | 6 | 5 | 4 | 3 | 2 | 1 |
|---|---|---|---|---|---|---|---|
| 0 | VERSION (0x01) ||||||||
| 1 | SEQUENCE NUMBER (0x00) |||||||
| 2 | LENGTH (OPCODE + OPERAND) |||||||
| 3 | |||||||
| 4 | OPCODE |||||||
| 5 | OPERAND |||||||
| 6 | |||||||

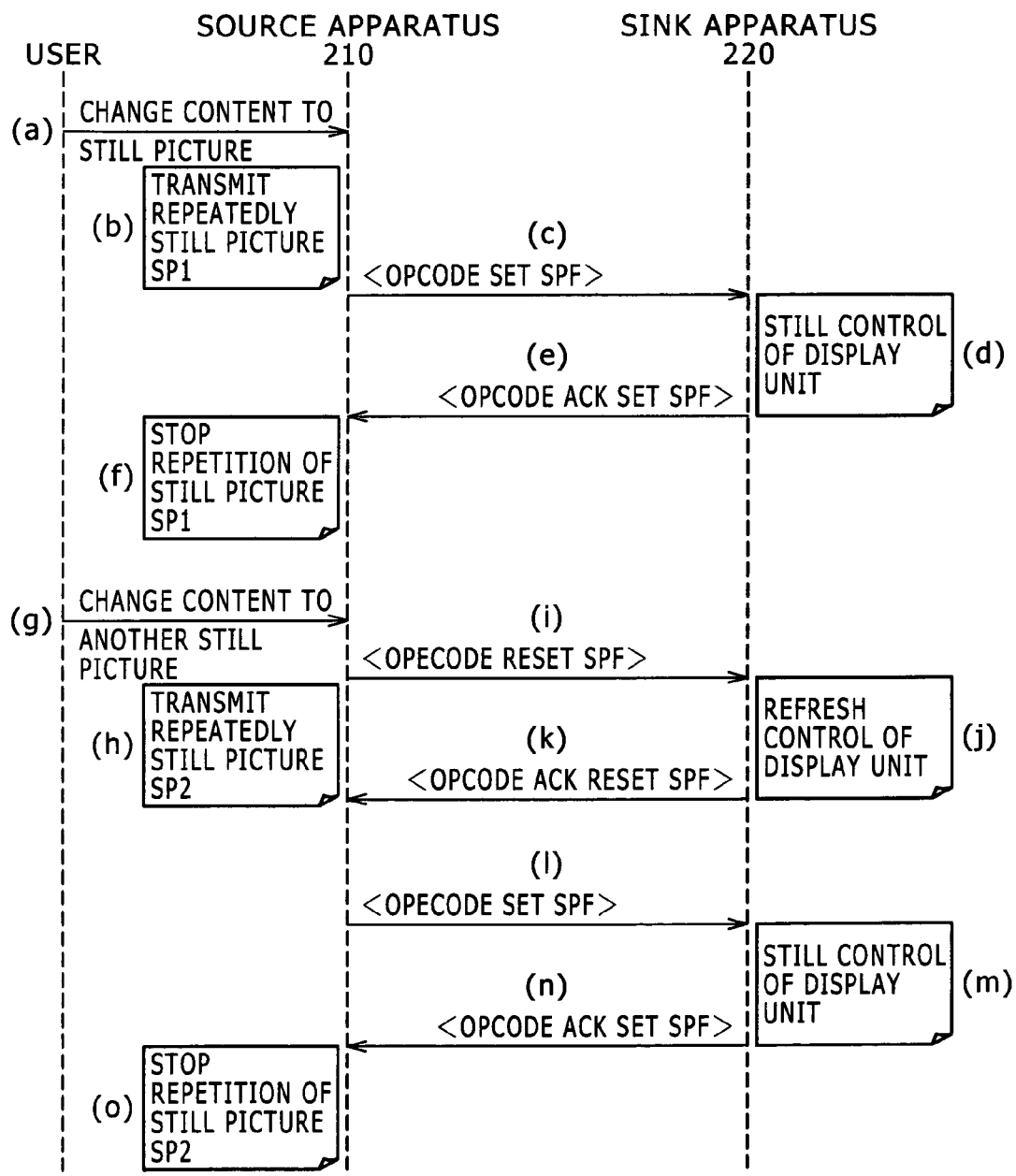

COMMUNICATION SYSTEM, VIDEO SIGNAL TRANSMISSION METHOD, TRANSMITTER, TRANSMITTING METHOD, RECEIVER, AND RECEIVING METHOD

CROSS-REFERENCE TO RELATED APPLICATIONS

The present application claims benefit of priority of Japanese Patent Application No. 2007-127159 filed in the Japanese Patent Office on May 11, 2007, the entire disclosure of which is incorporated herein by reference.

BACKGROUND OF THE INVENTION

1. Field of the Invention

The present invention relates to a communication system and video signal transmission method of wirelessly transmitting an uncompressed video signal, and a transmitter, transmitting method, receiver, and receiving method for the communication system or video signal transmission method.

2. Description of Related Art

In recent years, HDMI (High Definition Multimedia Interface) has become widely used as a communication interface for transmission at high speed of a digital video signal, i.e., an uncompressed (baseband) video signal (hereinafter referred to as "image data") and a digital audio signal (hereinafter referred to as "audio data") which accompanies the video signal to a television receiver, a projector, and other displays from a DVD (Digital Versatile Disc) recorder, a set-top box, and other AV sources (Audio Visual sources), for example (see Japanese Unexamined Patent Application Publication No. 2006-319503, for example).

With respect to the HDMI, a TMDS (Transition Minimized Differential Signaling) channel for an unidirectional transmission of the image data and the audio data at high speed from an HDMI source to an HDMI sink, a CEC (Consumer Electronics Control) line for performing a bidirectional communication between the HDMI source and the HDMI sink, or the like, are defined.

SUMMARY OF THE INVENTION

The above-described HDMI is defined such that a characteristic of an HDMI cable is not deteriorated to achieve the high-speed transmission. Thus, the HDMI is not suitable for the use of a long cable. As a result, there occurs a certain limitation to the arrangement of the source device and the sink device.

To eliminate this limitation, it has been proposed the use of a wireless transmission technology to solve the problem. In the case of a wireless transmission, unlike a transmission by cable, a wireless transmission bandwidth is finite and it becomes necessary to coexist with other systems. As a result, it is difficult to constantly occupy the transmission bandwidth.

In the above-described proposal, upon transmission of the uncompressed video signal between devices by using a wireless transmission technology, even if the signal to be transmitted is a video signal of a still picture content, re-transmitting of the video signal (baseband image data) in a refresh cycle by a frame rate is defined. However, in the case of transmitting a video signal of a still picture content, once the transmission of the video signal is done, the video signal may be maintained and used by the sink device even when the video signal is not transmitted again.

There is need to avoid a futile bandwidth occupation and to enable effective utilization of a finite transmission bandwidth.

Accordingly, an embodiment of the present invention is made to provide to a communication system which is configured such that when an uncompressed video signal of content is wirelessly transmitted, identification information for identifying whether the content is a still picture content is further transmitted, thereby avoiding a futile bandwidth occupation to effectively utilize a finite transmission bandwidth.

In accordance with an embodiment of the present invention, there is provided a transmitter which includes a video signal outputting unit for outputting an uncompressed video signal of a predetermine content, an identification information generating unit for generating identification information for identifying whether the predetermined content is a still picture content, and a transmitting unit for transmitting the video signal outputted from the video signal outputting unit and the identification information generated in the identification information generating unit to a wireless transmission path.

According to an embodiment of the present invention, an uncompressed video signal (baseband image data) of a predetermined content is outputted from a video signal outputting unit. An identification information generating unit generates identification information for identifying whether the predetermined content is a still picture content. The video signal and the identification information are transmitted to a wireless transmission path by a transmitting unit.

In the transmitting unit, the identification information may be transmitted to the wireless transmission path synchronously with the video signal, for example. In this case, the identification information is transmitted in a state being inserted in a blanking period of the video signal to the wireless transmission path, for example. Upon the inserting the identification information in the blanking period of the video signal, a packet which is AVI (Auxiliary Video Information) InfoFrame defined in CEA-861 may be utilized, for example. The AVI InfoFrame is a packet which originally serves to transmit supplemental information related to a video from a source device to a sink device.

In the transmitting unit, the identification information may be transmitted to the wireless transmission path asynchronously with the video signal, for example. In this case, an AVC Control/Message packet defined in IEEE1394 may be utilized, for example.

As described above, upon transmitting the uncompressed video signal of the predetermined content to the wireless transmission path, the identification information for identifying whether the content is the still picture content is further transmitted. As a result, a receiving side can identify whether the received video signal is a video signal relating the still picture content. It becomes possible to control to the received video signal based on a result of the identification, for example.

In an embodiment of the present invention, a source device and a wireless transmitter may be provided. The source device includes the video signal outputting unit and the identification information generating unit. The wireless transmitter includes the transmitting unit. The source device and the wireless transmitter may be connected by wire. In this case, for example, the source device is configured to transmit the video signal in which the identification information is inserted in a blanking period to the wireless transmitter by a differential signal through a plurality of channels. That is, in this case, the source device and the wireless transmitter are connected by a communication interface of HDMI. As described above, in a structure in which the transmitter is configured by the source device and the wireless transmitter, when the source device which does not have a wireless transmission function is connected with an adaptor-type wireless transmitter, it becomes possible to transmit the video signal and the identification information obtained by the source device to the wireless transmission path.

When the video signal outputted from the video signal outputting unit is a video signal related to a still picture content, the transmitting unit may be configured to transmit the video signal and the identification information to the wireless transmission path only for a predetermined time period. When the video signal outputted from the video signal outputting unit is a video signal related to the still picture content, the transmitting unit may stop transmitting the video signal and the identification information to the wireless transmission path in response to a confirmation response of the identification information from a receiving side.

As described above, whether the received video signal is a video signal relating a still picture content is identifiable by the identification information on the receiving side. For example, when the identification information is a video signal relating a still picture content, in the video signal processor, receiving (refreshing) by the video signal in a subsequent frame is stopped and a state where the held video signal is used is established. Accordingly, when the received video signal is a video signal relating a still picture content, any drawbacks are not caused even if the transmitting of the video signal and the identification information to the wireless transmission path is stopped, as described above.

In this manner, when the received video signal is a video signal relating a still picture content, a futile bandwidth occupation may be avoided and an effective utilization of a finite transmission bandwidth may be enabled by stopping the transmission of the video signal and the identification information to the wireless transmission path, as described above.

When the video signal outputted from the video signal outputting unit is changed from a video signal relating one still picture content to a video signal relating another still picture content, the identification information generating unit may set the generated identification information to a first state indicative of not a still picture content, and after a predetermined time period, change to a second state indicative of a still picture content.

As described above, when the receiving side receives identification information indicative of a video signal relating a still picture content, receiving (refreshing) by the video signal in a subsequent frame is stopped in the video signal processor and a state where the held video signal is used is established, based on the identification information indicative of a still picture content.

As a result, if is assumed that the identification information transmitted together with the video signal is in a state indicative of a still picture content when the video signal relating one still picture content is changed to a video signal relating another still picture content, there occurs inconvenience in the video signal processor on the receiving side that the video signal relating the other still picture content is not received. As described above, when the state of the identification information generated in the identification information generating unit changes, the video signal processor on the receiving side is made to receive the video signal relating the other still picture content, stops the receiving (refreshing) later, and is brought into a state where the held video signal is used.

In accordance with another embodiment of the present invention, there is provided a receiver which includes a receiving unit for receiving a video signal and identification information which are transmitted by a wireless transmission path, the video signal being an uncompressed video signal of a predetermined contend and the identification information identifying whether the predetermined content is a still picture content, a video signal processor for processing the video signal received in the receiving unit, and a controller for controlling an operation of the video signal processor based on the identification information received in the receiving unit.

The receiving unit receives the video signal and the identification information which are transmitted by the wireless transmission path. The received video signal is processed by the video signal processor. In the video signal processor, a video display process by the video signal is performed, for example. Based on the received identification information, an operation of the video signal processor is controlled by the controller.

For example, in a state which indicates that the identification information received in the receiving unit is not a still picture content, the video signal processor is controlled to receive the video signal received in the receiving unit. In a state which indicates that the identification information received in the receiving unit is a still picture content, the video signal processor is controlled to stop receiving the video signal received in the receiving unit.

A wireless receiver and a sink device may be provided. The wireless receiver includes the receiving unit and the sink device includes the video signal processor and the controller. The wireless receiver and the sink device may be connected by wire. In this case, for example, the wireless receiver is configured to transmit the video signal in which the identification information is inserted in a blanking period to the sink device by a differential signal through a plurality of channels. That is, in this case, the wireless receiver and the sink device are connected by a communication interface of HDMI. As described above, in a structure in which the receiver is configured by the wireless receiver and the sink device, when the sink device which does not have a wireless transmission function is connected with an adaptor-type wireless receiver, it becomes possible to receive the video signal and the identification information from the wireless transmission path and to supply the video signal and the identification information to the sink device.

The above summary of the present invention is not intended to describe each illustrated embodiment or every implementation of the present invention. The figures and the detailed description which follow more particularly exemplify these embodiments.

BRIEF DESCRIPTION OF THE DRAWSINGS

FIG. 4 is a diagram showing a structure of TMDS transmission data;

FIG. 5 is a timing chart showing a relationship between control bits CTL0 and CTL1, and a data island period and a control period;

FIG. 6 is a diagram showing a data structure of an AVI InfoFrame packet used at the time of transmitting identification information SPF indicating whether content is a still picture content;

FIG. 9 is a diagram showing a data structure of an AVC Control/Message packet used at the time of transmitting identification information SPF indicating whether content is a still picture content; and FIG. 10 is a control sequence chart showing one example of a control sequence between a source device and a sink device in the communication system.

DETAILED DESCRIPTION OF EMBODIMENTS

With reference to drawings, embodiments of the present invention will be described below.

Figure 1:
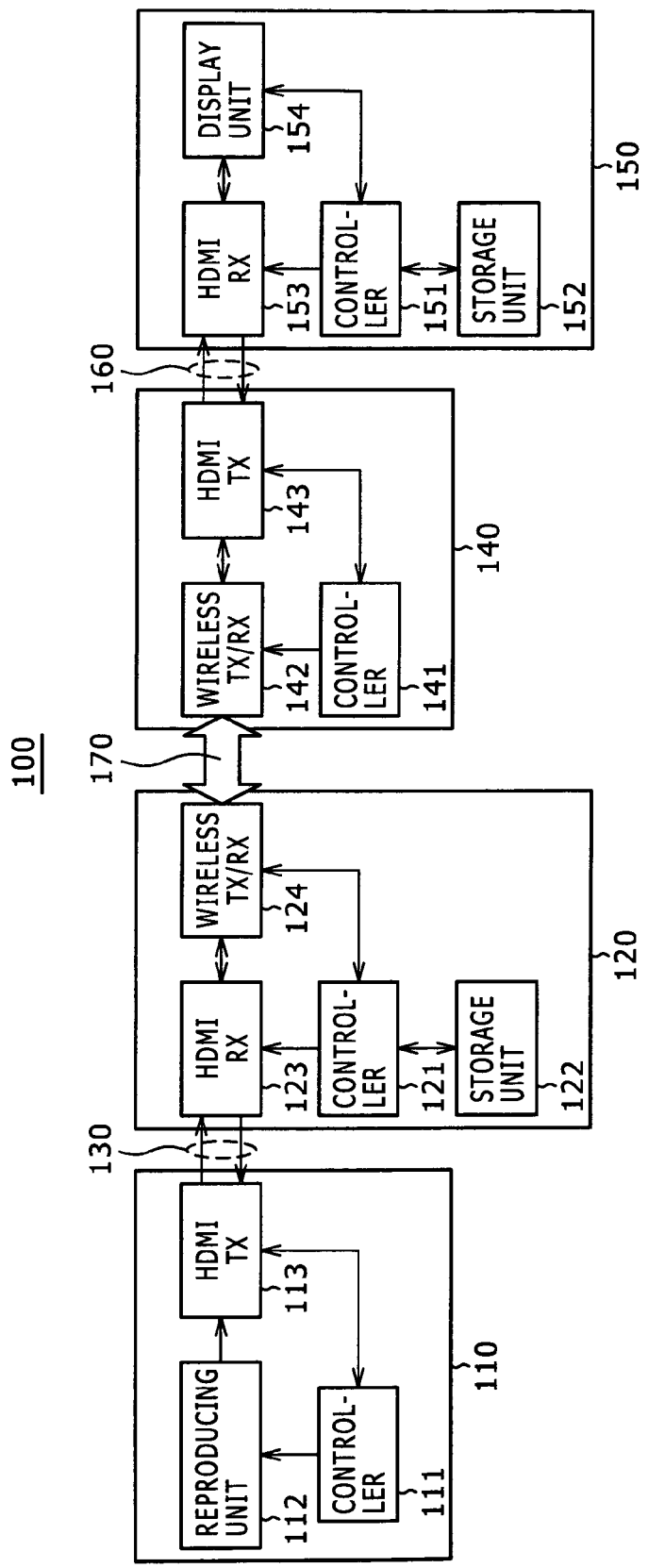
FIG. 1 is a block diagram showing a configuration example of a communication system as an embodiment of the present invention.

FIG. 1 shows a configuration example of a communication system 100 to which embodiments of the present invention is applied. The communication system 100 has a source device 110, a wireless transmitter 120, a wireless receiver 140, and a sink device 150.

The source device 110 and the wireless transmitter 120 constitute a transmitter. That is, the transmitter is configured to connect the adaptor-type wireless transmitter 120 to the source device 110 which is not equipped with a wireless transmission function. The source device 110 and the wireless transmitter 120 are connected by wire, in this embodiment, connected by an HDMI communication interface. The source device 110 and the wireless transmitter 120 are connected via an HDMI cable 130. The source device 110 and the wireless transmitter 120 may be directly connected by using connectors with each other instead of using the HDMI cable 130.

The source device 110 includes a controller 111, a reproducing unit 112, and an HDMI transmitting unit (HDMI source) 113. The controller 111 controls operations of the reproducing unit 112 and the HDMI transmitting unit 113. The reproducing unit 112 reproduces baseband image data (an uncompressed video signal) and audio data (an audio signal) which accompanies the image data of a content such as a moving picture content, a still picture content, or the like, from a recording medium(not shown), and supplies these data to the HDMI transmitting unit 113. Selection of the reproduced contents in the reproducing unit 112 is controlled by the controller 111 in response to a user operation.

According to a communication in conformity with HDMI, the HDMI transmitting unit (HDMI source) 113 transmits unidirectionally the baseband video and audio data supplied from the reproducing unit 112 via the HDMI cable 130 to the wireless transmitter 120. The HDMI source 113 inserts identification information for identifying whether the image data is an image data of a still picture content in a blanking period of the transmitted image data (video signal). The controller 111 generates the identification information and supplies the information to the HDMI transmitting unit 113. In this sense, the controller 111 constitutes an identification information generating unit. A detail of the identification information is described later.

The wireless transmitter 120 includes a controller 121, a storage unit 122, an HDMI receiving unit (HDMI sink) 123, and a wireless transmitting/receiving unit 124. The controller 121 controls operations of the HMDI receiving unit 123 and the wireless transmitting/receiving unit 124. The storage unit 122 is connected to the controller 121. The storage unit 122 is stored with information or the like necessary for controlling the controller 121.

According to a communication in conformity with the HDMI, the HDMI receiving unit (HDMI sink) 123 receives the baseband video and audio data unidirectionally transmitted from the HDMI transmitting unit 113 of the source device 110 connected via the HDMI cable 130, and supplies the received data to the wireless transmitting/receiving unit 124. The wireless transmitting/receiving unit 124 upconverts the baseband video and audio data supplied from the HDMI receiving unit (HDMI sink) 123 to a signal of a predetermined frequency band, for example a 60-GHz (mille wave) band, and transmits the upconverted signal to a wireless transmission path 170.

The wireless receiver 140 and the sink device 150 constitute a receiver. That is, the receiver is configured to connect an adaptor-type wireless receiver 140 to the sink device 150 which is not equipped with a wireless transmission function. The wireless receiver 140 and the sink device 150 are connected by wire, in this embodiment, by an HDMI communication interface. The wireless receiver 140 and the sink device 150 are connected via an HDMI cable 160. The wireless receiver 140 and the sink device 150 may be directly connected by using connectors with each other instead of using the HDMI cable 160.

The wireless receiver 140 includes a controller 141, a wireless transmitting/receiving unit 142, and an HDMI transmitting unit (HDMI source) 143. The controller 141 controls operations of the wireless transmitting/receiving unit 142 and the HDMI transmitting unit 143. The wireless transmitting/receiving unit 142 receives the signal, which is upconverted to a predetermined frequency band from the wireless transmission path 170, as described above. The received signal is subjected to a downconverting process to obtain the baseband video and audio data. The wireless receiving unit 142 supplies the obtained baseband video and audio data to the HDMI transmitting unit 143.

According to a communication in compliance with the HDMI, the HDMI transmitting unit (HDMI source) 143 transmits unidirectionally via the HDMI cable 160 to the sink device 150 the baseband video and audio data supplied from the wireless transmitting/receiving unit 142.

The sink device 150 includes a controller 151, a storage unit 152, an HDMI receiving unit (HDMI sink) 153, and a display unit 154. The display unit 154 constitutes a video signal processor. The controller 151 controls operations of the HDMI receiving unit 153 and the display unit 154. The storage unit 152 is connected to the controller 151. The storage unit 152 is stored with information such as E-EDID (Enhanced-Extended Display Identification) or the like necessary for controlling the controller 151.

According to a communication in compliance with the HDMI, the HDMI receiving unit (HDMI sink) 153 receives the baseband video and audio data transmitted unidirectionally from the HDMI transmitting unit (HDMI source) 143 of the wireless receiver 140 connected via the HDMI cable 160. The HDMI receiving unit 153 supplies the received image data to the display unit 154. The HDMI receiving unit 153 supplies the received audio data to a speaker(not shown), for example. Audio by the received audio data is outputted from the speaker.

The HDMI receiver 153 acquires the identification information (identification information for identifying whether the image data is an image data of still picture content) inserted in the blanking period of the received image data, and supplies the acquired identification information to the controller 151. The controller 151 controls a processing operation to the image data in the display unit 154 based on the identification information. The display unit 154 is configured by using a display element such as LCD (Liquid Crystal Display), organic EL (Electro Luminescence), CRT (Cathode Ray Tube).

Figure 2:
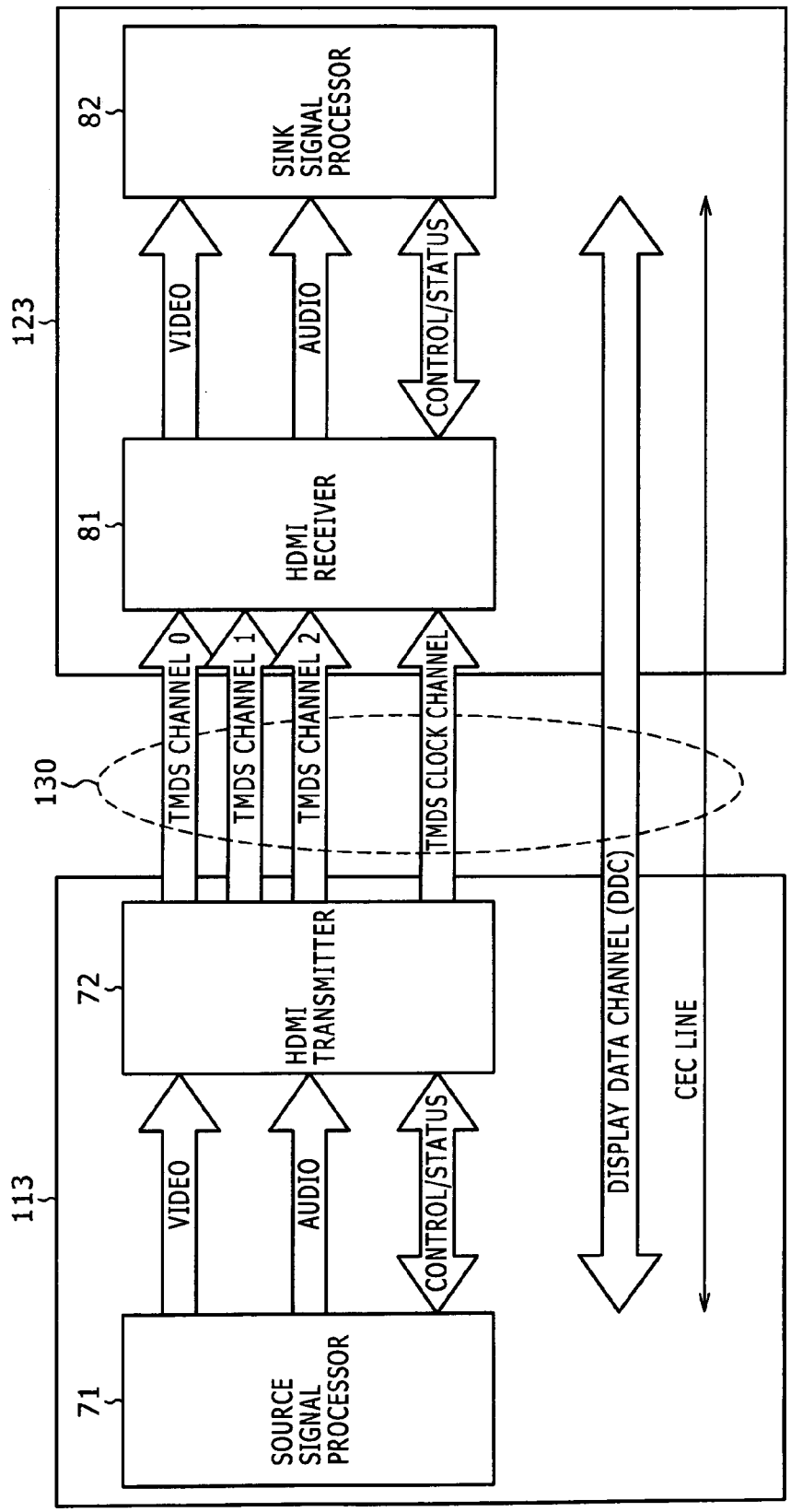
FIG. 2 is a block diagram showing a configuration example of an HDMI source and an HDMI sink.

FIG. 2 shows an embodiment of a configuration of the HDMI transmitting unit (HDMI source) 113 of the source device 110 and the HDMI receiving unit (HDMI sink) 123 of the wireless transmitter 120 in the communication system 100 in FIG. 1.

The HDMI transmitting unit 113 transmits unidirectionally a differential signal of the baseband (uncompressed) image data of one screen through a plurality of channels in an effective video period (hereinafter, may be referred to as an "active video period"), which is a period obtained by removing a horizontal blanking period and a vertical blanking period from a period between a certain vertical synchronizing signal to a subsequent synchronizing signal (hereinafter, may be referred to as a "video field"), to the HDMI receiving unit 123. In the horizontal blanking period and the vertical blanking period, the HDMI transmitting unit 113 transmits unidirectionally a differential signal which corresponds to auxiliary data or the like such as the audio data which accompanies the image data, a control packet, or the like, to the HDMI receiving unit 123 through a plurality of channels.

The HDMI transmitting unit 113 includes a source signal processor 71 and an HDMI transmitter 72. The source signal processor 71 is supplied with the uncompressed baseband video and audio data from the reproducing unit 112 (see FIG. 1). The source signal processor 71 applies a necessary process to the supplied video and audio data, and supplies the processed data to the HDMI transmitter 72. The source signal processor 71 optionally exchanges control information or information for informing a status (Control/Status) or the like with the HDMI transmitter 72.

The HDMI transmitter 72 converts the image data supplied from the source signal processor 71 into a corresponding differential signal, and transmits unidirectionally the converted differential signal to the HDMI receiving unit 123 connected via the HDMI cable 130 through a plurality of channels, i.e., three TMDS channels #0, #1, and #2.

The transmitter 72 converts auxiliary data such as the audio data which accompanies the uncompressed image data, the control packet, or the like, and control data such as a vertical synchronizing signal (VSYNC), a horizontal synchronizing signal (HSYNC), or the like, each of which is supplied from the source signal processor 71, into a corresponding differential signal, and transmits the converted signal unidirectionally to the HDMI receiving unit 123 connected via the HDMI cable 130 through the three TMDS channels, i.e., #0, #1, and #2.

Further, the transmitter 72 transmits a pixel clock which is synchronized with the image data transmitted through the three TMDS channels, i.e., #0, #1, and #2, to the HDMI receiving unit 123 connected via the HDMI cable 130 through the TMDS channel.

The HDMI receiving unit 123 receives the differential signal which corresponds to the image data transmitted unidirectionally from the HDMI transmitting unit 113 through a plurality of channels in the active video period, and receives the differential signal which corresponds to the auxiliary data or the control data transmitted from the HDMI transmitting unit 113 through a plurality of channels in the horizontal blanking period and the vertical blanking period.

The HDMI receiving unit 123 includes an HDMI receiver 81 and a sink signal processor 82. In synchronization with the pixel clock transmitted from the same HDMI transmitting unit 113 through a TMDS clock channel, the HDMI receiver 81 receives the differential signal which corresponds to the image data and the differential signal which corresponds to the auxiliary data or the control data. The differential signals are transmitted unidirectionally from the HDMI transmitting unit 113 connected via the HDMI cable 130 through the TMDS channels #0, #1, and #2. The HDMI receiver 81 converts the differential signals into corresponding image data, auxiliary data, and control data, and optionally supplies these data to the sink signal processor 82.

The sink signal processor 82 applies a necessary process to the data supplied from the HDMI receiver 81, and supplies the processed data to the wireless transmitting/receiving unit 124. Further, the sink signal processor 82 optionally exchanges control information or information for informing a status (Control/Status) or the like with the HDMI receiver 81.

Transmission channels of HDMI include: three TMDS channels #0, #1, and #2, each of which serves to transfer the image data, the auxiliary data, and the control data synchronously with the pixel clock from the HDMI transmitting unit 113 to the HDMI receiving unit 123 in an unidirectional serial transmission manner; a TMDS clock channel which is a transmission channel for transmission of a pixel clock; DDC (Display Data Channel); and a transmission channel called a CEC line.

Figure 3:
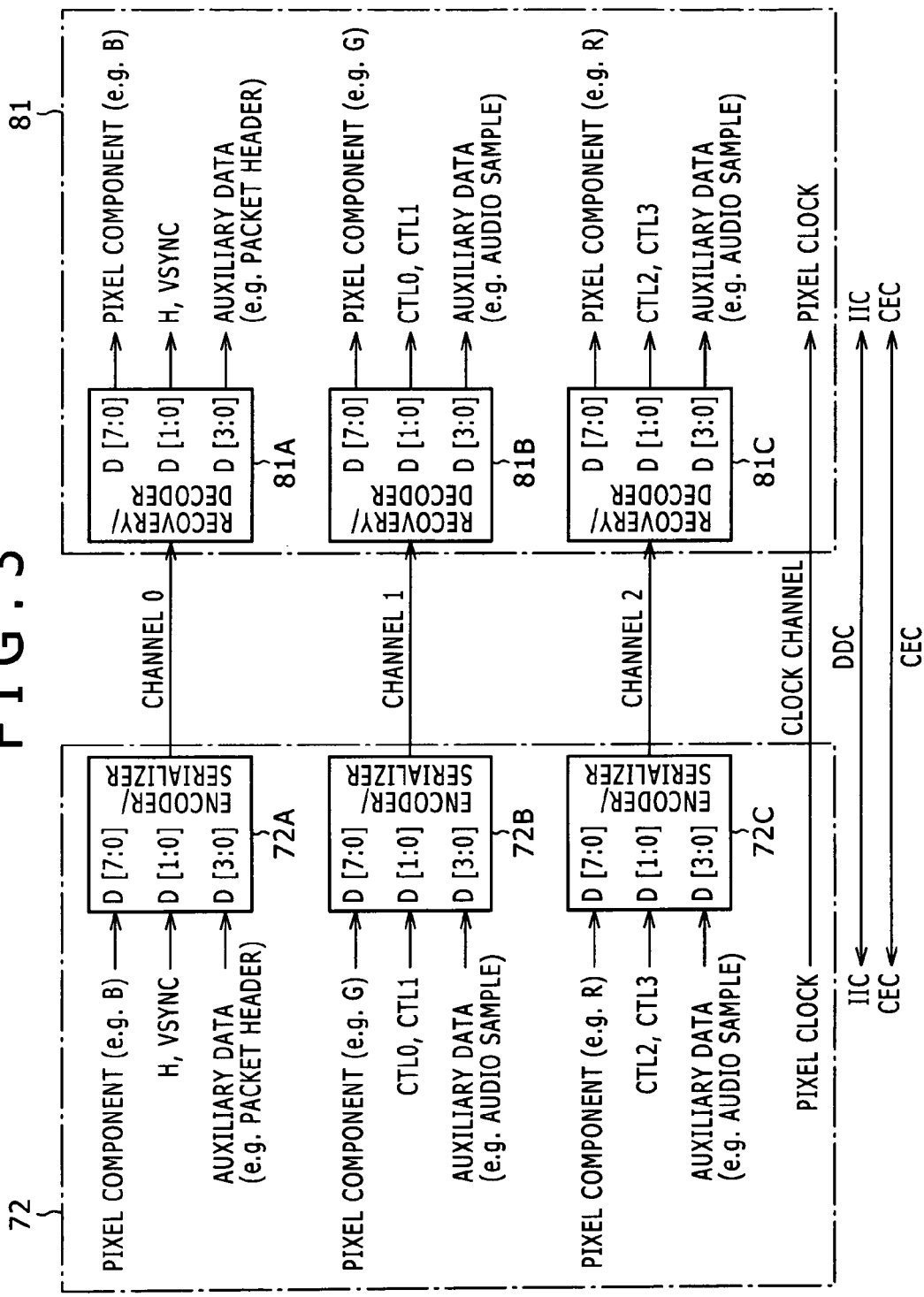
FIG. 3 is a block diagram showing a configuration example of an HDMI transmitter and an HDMI receiver.

FIG. 3 shows an example of configuration of the HDMI transmitter 72 and the HDMI receiver 81 in FIG. 2.

The HDMI transmitter 72 has three encoders/serializers 72A, 72B, and 72C, each of which corresponds to the three TMDS channels #0, #1, and #2. Each of the encoders/serializers 72A, 72B, and 72C encodes the image data, the auxiliary data, and the control data supplied to the encoders/serializers 72A, 72B, and 72C, converts the encoded data from parallel data to serial data, and transmits the converted data by the differential signal. When the image data has three components, for example, R(red), G(green), and B(blue), a B component is supplied to the encoder/serializer 72A, a G component is supplied to the encoder/serializer 72B, and an R component is supplied to the encoder/serializer 72C.

Examples of the auxiliary data include the audio data and the control packet. The control packet is supplied to the encoder/serializer 72A, and the audio data is supplied to the encoders/serializers 72B and 72C, for example.

Examples of the control data include a 1-bit vertical synchronizing signal (VSYNC), a 1-bit horizontal synchronizing signal (HSYNC), and control bits CTL0, CTL1, CTL2, and CTL3, each of which is one bit. The vertical synchronizing signal and the horizontal synchronizing signal are supplied to the encoder/serializer 72A. The control bits CTL0 and CTL1 are supplied to the encoder/serializer 72B, and the control bits CTL2 and CTL3 are supplied to the encoder/serializer 72C.

The encoder/serializer 72A transmits in a time division manner the B component of the image data, the vertical synchronizing signal and the horizontal synchronizing signal, and the auxiliary data, each of which is supplied to the encoder/serializer 72A. That is, the encoder/serializer 72A converts the B component of the image data supplied to the encoder/serializer 72A into parallel data of an 8-bit unit which is a fixed bit number. The encoder/serializer 72A encodes the parallel data, converts the encoded data into serial data, and transmits the converted data through the TMDS channel #0.

The encoder/serializer 72A encodes 2-bit parallel data of the vertical synchronizing signal and the horizontal synchronizing signal supplied to the encoder/serializer 72A, converts the encoded data into serial data, and transmits the converted data through the TMDS channel #0. The encoder/serializer 72A converts auxiliary data supplied thereto into 4-bit-unit parallel data. The encoder/serializer 72A encodes the parallel data, converts the encoded data into serial data, and transmits the converted data through the TMDS channel #0.

The encoder/serializer 72B transmits in a time division manner the G component of the image data, the control bits CTL0 and CTL1, and the auxiliary data, each of which is supplied to the encoder/serializer 72B. That is, the encoder/serializer 72B converts the G component of the image data supplied to the encoder/serializer 72B into parallel data of an 8-bit unit, which is a fixed bit number. The encoder/serializer 72B encodes the parallel data, converts the encoded data into serial data, and transmits the converted data through the TMDS channel #1.

The encoder/serializer 72B encodes the 2-bit parallel data of the control bits CTL0 and CTL1 supplied to the encoder/serializer 72B, converts the encoded data into serial data, and transmits the serial data through the TMDS channel #1. The encoder/serializer 72B sets the auxiliary data supplied thereto to 4-bit-unit parallel data. The encoder/serializer 72B encodes the parallel data, converts the encoded data into serial data, and transmits the converted data through the TMDS channel #1.

The encoder/serializer 72C transmits in a time division manner the R component of the image data, the control bits CTL2 and CTL3, and the auxiliary data, each of which is supplied to the encoder/serializer 72C. Namely, the encoder/serializer 72C sets the R component of the image data supplied thereto to parallel data of an 8-bit unit which is a fixed bit number. The encoder/serializer 72C encodes the parallel data, converts the encoded data into serial data, and transmits the converted data through the TMDS channel #2.

The encoder/serializer 72C encodes the 2-bit parallel data of the control bits CTL2 and CTL3 supplied to the encoder/serializer 72C, converts the encoded data into serial data, and transmits the serial data through the TMDS channel #2. The encoder/serializer 72C sets the auxiliary data supplied thereto to parallel data of a 4-bit unit. The encoder/serializer 72C encodes the parallel data, converts the encoded data into serial data, and transmits the serial data through the TMDS channel #2.

The HDMI receiver 81 has three recovery/decoders 81A, 81B, and 81C, which correspond to the three TMDS channels #0, #1, and #2, respectively. Each of the recovery/decoders 81A, 81B, and 81C receives the image data, the auxiliary data, and the control data transmitted by the differential signal through the TMDS channels #0, #1, and #2. Each of the recovery/decoders 81A, 81B, and 81C converts the image data, the auxiliary data, and the control data from the serial data into the parallel data, further decodes the converted data, and outputs the decoded data.

That is, the recovery/decoder 81A receives the B component of the image data, the vertical synchronizing signal and horizontal synchronizing signal, and the auxiliary data transmitted by the differential signal through the TMDS channel #0. The recovery/decoder 81A converts the B component of the image data, the vertical synchronizing signal and the horizontal synchronizing signal, and the auxiliary data from the serial data into the parallel data, decodes the converted data, and outputs the decoded data.

The recovery/decoder 81B receives the G component of the image data, the control bits CTL0 and CTL1, and the auxiliary data, which are transmitted by the differential signal through the TMDS channel #1. The recovery/decoder 81B converts the G component of the image data, the control bits CTL0 and CTL1, and the auxiliary data from the serial data into the parallel data, decodes the converted data, and outputs the decoded data.

The recovery/decoder 81C receives the R component of the image data, the control bits CTL2 and CTL3, and the auxiliary data, which are transmitted by the differential signal through the TMDS channel #2. The recovery/decoder 81C converts the R component of the image data, the control bits CTL2 and CTL3, and the auxiliary data from the serial data into the parallel data, decodes the converted data, and outputs the decoded data.

FIG. 4 shows an example of a transmission period (interval) in which various transmission data are transmitted through the three TMDS channels #0, #1, and #2 of the HDMI. FIG. 4 shows periods of various transmission data when a progressive video which is composed of 720 pixels horizontally and 480 pixels vertically is transmitted through the TMDS channels #0, #1, and #2.

In Video Field in which the transmission data are transmitted through the three TMDS channels #0, #1, and #2 of the HDMI, there exist three types of periods, i.e., an Image Data period, a data island period, and a control period, depending on types of the transmission data.

In this case, the Video Field period is a period which lasts from an active edge of a certain vertical synchronizing signal to an active edge of a subsequent vertical synchronizing signal. The Video Field is divided into: the horizontal blanking period; the vertical blanking period; and the Active Video period which removes the horizontal blanking period and the vertical blanking period from the Video Field period.

The Image Data period is allotted to the Active Video period. In this Image Data period, data of an active pixel which is composed of 720 pixels×480 lines which constitutes uncompressed 1-screen image data is transmitted.

The data island period and the control period are allotted to the horizontal blanking period and the vertical blanking period. In the data island period and the control period, the auxiliary data is transmitted.

That is, the data island period is allotted to a part of the horizontal blanking period and the vertical blanking period. During the data island period, data which forms part of the auxiliary data and which is not related to the control, for example a packet or the like of the audio data, is transmitted.

The control period is allotted to other parts of the horizontal blanking period and the vertical blanking period. During the control period, data which forms part of the auxiliary data and which is related to the control, for example the vertical synchronizing signal and horizontal synchronizing signal, the control packet, or the like, is transmitted.

According to the current HDMI, a frequency of the pixel clock which is transmitted through a TMDS clock channel is 165 MHz, for example, and in this case, a transmission rate of the data island period is about 500 Mbps.

As described above, in both the data island period and the control period, the auxiliary data is transmitted. These periods are distinguished by the control bits CTL0 and CTL1. That is, FIG. 5 shows a relationship between the control bits CTL0 and CTL1, and the data island period and the control period.

As shown in top of FIG. 5, for example, the control bits CTL0 and CTL1 may represent two states, i.e., a device enable state, and a device disable state. In the top of FIG. 5, the device enable state is represented by an H (High) level, and the device disable state is represented by an L (Low) level. The control bits CTL0 and CTL1 are in the device disable state during the data island period, and are in the device enable state during the control period. Thus, the data island period and the control period are distinguished.

During the data island period over which the control bits CTL0 and CTL1 are at the L level which is the device disable state, the data which forms part of the auxiliary data and which is not related to control, such as the audio data or the like, is transmitted, as shown in the second line from the top in FIG. 5. On the other hand, during the control period over which the control bits CTL0 and CTL1 are at the H level which is the device enable state, data which forms part of the auxiliary data and which is related to control, such as the control packet, a preamble or the like, is transmitted, as shown in the third line from the top in FIG. 5. In addition, during the control period, the vertical synchronizing signal and the horizontal synchronizing signal also are transmitted, as shown in the fourth line from the top in FIG. 5.

Although a detailed description is omitted, the HDMI transmitting unit (HDMI source) 143 of the wireless receiver 140 and the HDMI receiving unit (HDMI sink) 153 of the sink device 150 in the communication system 100 in FIG. 1 are also configured similarly to the HDMI transmitting unit 113 and the HDMI receiving unit 123.

Subsequently, as described above, a description is given of the identification information (identification information for identifying whether the image data is an image data of still picture content) SPF (Still Picture Flag) inserted in the blanking period of the image data (the video signal) in the HDMI transmitting unit (HDMI source) 113 of the source device 110.

FIG. 6 shows a data structure of an AVI (Auxiliary Video Information) InfoFrame packet located in the above-described data island period. In the HDMI, the AVI InfoFrame packet allows to transmit supplemental information regarding the video from the source device to the sink device. The AVI InfoFrame is transmitted once by each picture frame, so that data of the AVI InfoFrame is changed to inform the sink device of the change when a format or the like of the video signal is changed.

In the data structure shown in FIG. 6, the first to third bytes constitute a header. A packet type is written in the first byte. In this case, "0x82(8216)" which indicates the AVI InfoFrame packet used in the present invention is written. In the second byte, version information is written. In the third byte, information which represents a packet length is written. In this case, "0xD(13)" is written.

In an embodiment of the present invention, the identification information SPF is located at the eighth byte (Data Byte5) and the fourth bit of the AVI InfoFrame pacekt, as shown in the data structure in FIG. 6. For example, a state of SPF="1" indicates that the image data is still picture content. For example, a state of SPF="0" indicates that the image data is not a still picture content.

An operation of the communication system 100 shown in FIG. 1 is described. In the reproducing unit 112 of the source device 110, the predetermined content is reproduced in response to a selection operation by a user. The baseband (uncompressed) video and audio data regarding the predetermined content, obtained in the reproducing unit 112, are supplied to the HDMI transmitting unit (HDMI source) 113. From the controller 111, the identification information SPF indicating whether the content reproduced in the reproducing unit 112 is a still picture content is generated. The identification information SPF is supplied from the controller 111 to the HDMI transmitting unit (HDMI source) 113.

In the HDMI transmitting unit 113, the identification information SPF is inserted in the blanking period of the image data. That is, in the HDMI transmitting unit 113, the identification information SPF is located at the eighth byte (Data Byte5) and the fourth bit of the AVI InfoFrame packet inserted in the blanking period of the image data.

In the HDMI transmitting unit 113, according to a communication in compliance with the HDMI, the image data and the audio data in which the identification information SPF is inserted in the blanking period are transmitted unidirectionally via the HDMI cable 130 to the wireless transmitter 120.

In the HDMI receiving unit (HDMI sink) 123 of the wireless transmitter 120, according to a communication in compliance with the HDMI, the baseband video and audio data transmitted unidirectionally from the HDMI transmitting unit 113 of the source device 110 are received, and the received data are supplied to the wireless transmitting/receiving unit 124. In the wireless transmitting/receiving unit 124, the baseband video and audio data supplied from the HDMI receiving unit (HDMI sink) 123 are upconverted to a signal of a predetermined frequency band, for example a 60-GHz (mille wave) band, and the upconverted signal is transmitted to the wireless transmission path 170.

In the wireless transmitting/receiving unit 142 of the wireless receiver 140, the signal upconverted to the predetermined frequency band as described above is received from the wireless transmission path 170, and the signal is subjected to a downconverting process. As a result, the baseband (uncompressed) video and audio data are obtained. Thus, the baseband video and audio data obtained in the wireless receiving unit 142 are supplied to the HDMI transmitting unit 143. In the HDMI transmitting unit 143, according to a communication in compliance with the HDMI, the baseband video and audio data supplied from the wireless transmitting/receiving unit 142 are transmitted unidirectionally via the HDMI cable 160 to the sink device 150.

In the HDMI receiving unit (HDMI sink) 153 of the sink device 150, according to a communication in compliance with the HDMI, the baseband video and audio data transmitted unidirectionally from the HDMI transmitting unit (HDMI source) 143 of the wireless receiver 140 are received. The baseband (uncompressed) image data received in the HDMI receiving unit 153 is supplied to the display unit 154. In the display unit 154, the image data supplied from the HDMI receiving unit 153 is processed, and visual image produced by the image data is displayed. The baseband (uncompressed) audio data received in the HDMI receiving unit 153 is supplied to the speaker(not shown), and audible sound produced by the audio data is outputted.

In the HDMI receiving unit 153, the identification information SPF inserted in the blanking period of the image data is acquired, and the identification information SPF is supplied to the controller 151. An operation in the display unit 154 is controlled based on the identification information SPF. That is, when the identification information SPF is "0", which is indicative of not a still picture content, the display unit 154 is controlled to receive the image data obtained in the HDMI receiving unit 153. In this case, the display unit 154 is in a refresh control state where a display is refreshed by each frame rate.

When the identification information SPF is "1", which is indicative of a still picture content, the display unit 154 is controlled to stop receiving the image data obtained in the HDMI receiving unit 153. In this case, the display unit 154 is in a still control state where the image data held before stopping the reception is used to display.

In the source device 110, when the still picture content is reproduced in the reproducing unit 112, identical image data is repeatedly obtained by each frame rate from the reproducing unit 112, and as described above, the obtained data is upconverted to the predetermined frequency band by the wireless transmitter 120, and the upconverted data is transmitted to the wireless transmission path 170. The transmission of the image data regarding such a still picture content is performed only for a predetermined time period, and thereafter, the transmission is stopped.

As described above, when the image data received in the HDMI receiving unit 153 is an image data of still picture content, the sink device 150 stops receiving (refreshing) of the image data in a subsequent frame in which the identification information SPF in a state indicative of the still picture content is acquired, and a still picture display by the held image data is performed. Because of this, when the still picture content is reproduced in the reproducing unit 112, even if the transmission of the image data to the wireless transmission path 170 is stopped only for a predetermined time period, as above-described, a problem may not be found. Thus, the stop of the image data transmission allows the communication system to avoid a futile bandwidth occupation, whereby an effective utilization of a finite transmission bandwidth is enabled.

In the source device 110, when the still picture content reproduced in the reproducing unit 112 is changed from a still picture content to another still picture content, the identification information SPF generated in the controller Ill is firstly in a state indicative of not a still picture content, and after a predetermined time period, the identification information SPF is changed to a state indicative of a still picture content.

As described above, when the image data received in the HDMI receiving unit 153 is an image data of still picture content, the sink device 150 stops receiving (refreshing) of the image data in a subsequent frame in which the identification information SPF in a state indicative of the still picture content is acquired, and a still picture display by the held image data is performed.

As a result, when the certain still picture content is changed to another still picture content, if it is assumed that the identification information SPF transmitted together with the image data of the other still picture content is in a state indicative of a still picture content, the controller 151 of the sink device 150 recognizes that the identification information SPF remains in a state indicative of a still picture content, and the display unit 154 controlled by the controller 151 is caused to remain in a state where the reception of the image data is stopped. As a result, the image data of the other still picture content received by the HDMI receiving unit 153 is not received in the display unit 154.

When the state of the identification information SPF generated in the controller 111 of the source device 110 is changed as described above, the display unit 154 of the sink device 150 receives the image data of the other still picture content, and thereafter, the reception of the image data is stopped again, and the display unit 154 is brought into a state where the held image data is used.

Figure 7:
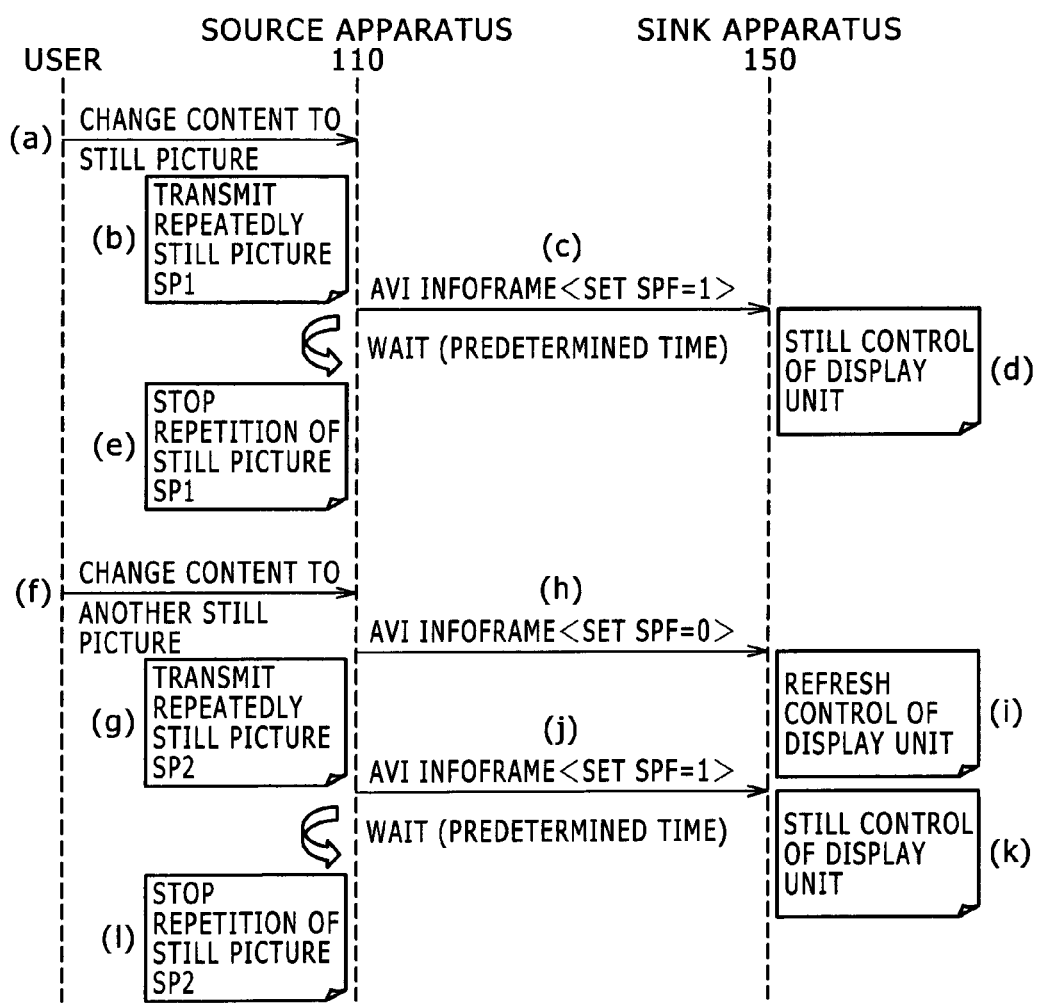
FIG. 7 is a control sequence chart showing one example of a control sequence between a source device and a sink device in the communication system.

FIG. 7 shows one example of a control sequence between the source device 110 and the sink device 150.

(a) When the content reproduced in the reproducing unit 112 of the source device 110 is changed from a moving picture content to a still picture content SP1 by the user operation.

(b) The image data of the still picture content SP1 is repeatedly outputted in a refresh cycle by a frame rate from the reproducing unit 112, and the outputted data is transmitted to the sink device 150.

(c) The identification information SPF in the AVI InfoFrame, transmitted together with the image data of this still picture content SP1, is in a state indicative of a still picture content, for example "1".

(d) The display unit 154 of the sink device 150 firstly receives the image data of the still picture content SP1 transmitted from the source device 110. However, since the identification information SPF transmitted together with the image data is in a state of "1" which indicates that the image data is still picture content, the display unit 154 stops receiving the image data later and is moved to the still control state where the display is performed by using the held image data.

(e) After a predetermined time period, the source device 110 stops reproducing the still picture content SP1 transmitted from the reproducing unit 112, and stops transmitting to the sink device 150 the image data of the still picture content SP1.

(f) Thereafter, when the content reproduced in the reproducing unit 112 of the source device 110 is changed from the still picture content SP1 to another still picture content SP2 by the user operation.

(g) image data of the still picture content SP2 is repeatedly outputted in a refresh cycle by a frame rate from the reproducing unit 112 of the source device 110, and the outputted data is transmitted to the sink device 150.

(h) The identification information SPF in the AVI InfoFrame, transmitted together with the image data of this still picture content SP2, is firstly set to a state "0" which indicates that the image data is a still picture content.

(i) Because of this, the still control state of the display unit 154 of the sink device 150 is cancelled, and the display unit 154 receives the image data of the still picture content SP2 and is moved to the refresh control state where the display is refreshed by each frame rate.

(j) Thereafter, the identification information SPF in the AVI InfoFrame, which is generated in the controller 111 of the source device 110 and which is transmitted together with the image data of the still picture content SP2, is changed to a state "1" which indicates that the image data is a still picture content.

(k) Since the identification information SPF, transmitted together with the image data of the still picture content SP2, is changed to a state "1" which indicates that the image data is a still picture content, the display unit 154 of the sink device 150 stops receiving the image data and is moved to the still control state where the display is performed by using the held image data.

(l) After a predetermined time period, the source device 110 stops reproducing the still picture content SP2 transmitted from the reproducing unit 112, and stops transmitting to the sink device 150 the image data of the still picture content SP2.

As described above, in the communication system 100 shown in FIG. 1, upon transmitting the baseband (uncompressed) image data of a predetermined content from the source device 110 to the sink device 150, the identification information SPF for identifying whether the predetermined content is a still picture content is inserted in the AVI InfoFrame packet located in the blanking period of the image data.

Accordingly, in the sink device 150, the controller 151 is capable of identifying whether the transmitted image data is an image data of still picture content based on the identification information SPF. When the image data is an image data of still picture content, the display unit 154 stops receiving the image data under the control of the controller 151, and then, is moved to the still control state where the display is performed by using the held image data.

After a predetermined time period, the source device 110 is capable of stopping reproducing the still picture content transmitted from the reproducing unit 112 and stopping transmitting the image data of the still picture content to the sink device 150. As a result, it becomes possible to avoid a futile bandwidth occupation generated by re-transmission of the image data of the still picture content, so that a finite transmission bandwidth may be effectively utilized.

Figure 8:
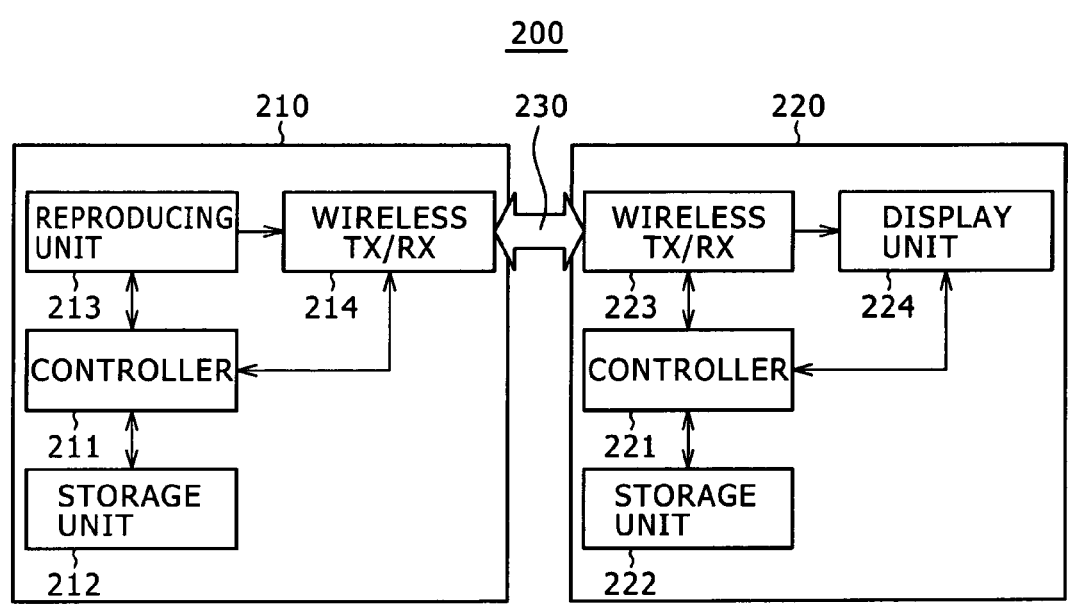
FIG. 8 is a block diagram showing a configuration example of a communication system as another embodiment of the present invention.

Subsequently, another embodiment of the present invention is described. FIG. 8 shows a configuration example of another communication system 200 to which the present invention is applied. The communication system 200 is configured by a source device 210 and a sink device 220. The source device 210 and the sink device 220 each have a wireless transmission function.

The source device 210 includes a controller 211, a storage unit 212, a reproducing unit 213, and a wireless transmitting/receiving unit 214. The controller 211 controls operations of the reproducing unit 213 and the wireless transmitting/receiving unit 214. The storage unit 212 is connected to the controller 211. The storage unit 212 is stored with information or the like necessary for controlling the controller 211.

The reproducing unit 213 reproduces baseband image data (an uncompressed video signal) and audio data (an audio signal) which accompanies the image data of a predetermined content such as a moving picture content, a still picture content, or the like, and supplies the reproduced data to the wireless transmitting/receiving unit 214. Selection of the reproduced contents in the reproducing unit 213 is controlled by the controller 211 in response to a user operation. The controller 211 generates the identification information for identifying whether the image data supplied from the reproducing unit 213 to the wireless transmitting/receiving unit 214 is an image data of still picture content, and supplies the identification information to the wireless transmitting/receiving unit 214.

The wireless transmitting/receiving unit 214 upconverts the baseband video and audio data supplied from the reproducing unit 213 to a signal of a predetermined frequency band, for example a 60-GHz (mille wave) band, and transmits the upconverted signal to a wireless transmission path 230. The wireless transmitting/receiving unit 214 upconverts the identification information supplied from the controller 211 to the signal of the predetermined frequency band, and transmit the upconverted signal to the wireless transmission path 230. In this case, the identification information is transmitted to the wireless transmission path 230 asynchronously with the image data.

The sink device 220 includes a controller 221, a storage unit 222, a wireless transmitting/receiving unit 223, and a display unit 224. The display unit 224 constitutes a video signal processor. The controller 221 controls operations of the wireless transmitting/receiving unit 223 and the display unit 224. The storage unit 222 is connected to the controller 221. The storage unit 222 is stored with information such as E-EDID (Enhanced-Extended Display Identification) or the like necessary for controlling the controller 221.

The wireless transmitting/receiving unit 223 receives the signal upconverted to a predetermined frequency band from the wireless transmission path 230, and applies a downconverting process to the upconverted signal to obtain the above-described baseband video and audio data and the identification information (the identification information for identifying whether the image data is an image data of still picture content).

The wireless transmitting/receiving unit 223 supplies the obtained baseband image data to the display unit 224. The wireless transmitting/receiving unit 223 supplies the obtained audio data to a speaker(not shown), for example. Audible sound produced by the received audio data is outputted from the speaker. The wireless transmitting/receiving unit 223 supplies the obtained identification information to the controller 221. The controller 221 controls a process operation to the image data in the display unit 224 based on the identification information. The display unit 224 is configured by a display element such as LCD (Liquid Crystal Display), organic EL (Electro Luminescence), CRT (Cathode Ray Tube) or the like, for example.

Subsequently, as described above, a description is given of the identification information (the identification information for identifying whether the image data is an image data of still picture content) generated in the controller 211 of the source device 210.

In this embodiment of the present invention, to transmit the above-described identification information, an AVC Control/Message packet of which a data structure is shown in FIG. 9, for example, is used. That is, the controller 211 of the source device 210 generates the AVC Control/Message packet when the identification information is transmitted.

In the data structure shown in FIG. 9, there is written a version in a 0-th byte. In this example, "0x01" of device control is written. In the first byte, a Sequence Number is written. The Sequence Number indicates continuity of packets. In this case, however, the Sequence Number is not necessary, and thus, "0x00" is written. In the second byte, information representing a data length of Opcode and Operand is written. In this case, "0x04" is written. In the third to fourth bytes, Opcode which indicates notification of an output format is written. In this case, "0x0012" is set. In the fifth to sixth bytes, Operand which is the above-described identification information SPF is written. For example, in the case of indicating a still picture content, "0x8000" is set, and in the case of indicating not a still picture content, "0x0000" is set.

The AVC Control/Message packet of the data structure shown in FIG. 9 also is used for a response from the sink device 220 to the source device 210. In this case, for example, the Opcode is set to "0x0013" and the Operand is set to "0x0000" (accepted) or "0x0100" (not yet).

An operation of the communication system 200 shown in FIG. 8 is described. In the reproducing unit 213 of the source device 210, a predetermined content is reproduced according to a selection operation of a user. Baseband (uncompressed) video and audio data related to the predetermined content, obtained in the reproducing unit 213, are supplied to the wireless transmitting/receiving unit 214. In the wireless transmitting/receiving unit 214, the baseband video and audio data supplied from the reproducing unit 213 are upconverted to a signal of a predetermined frequency band, for example a 60-GHz (mille wave) band, and the upconverted signal is transmitted to the wireless transmission path 230.

In the controller 211, the above-described AVC Control/Message packet (see FIG. 9) including the identification information SPF indicating whether the predetermined content reproduced in the reproducing unit 213 is a still picture content is generated. The AVC Control/Message packet is supplied to the wireless transmitting/receiving unit 214. In the wireless transmitting/receiving unit 214, the AVC Control/Message packet supplied from the controller 211 is upconverted to a signal of a predetermined frequency band, for example a 60-GHz (mille wave) band, and the upconverted signal is transmitted to the wireless transmission path 230.

In the wireless transmitting/receiving unit 223 of the sink device 220, the signal thus upconverted to the predetermined frequency band is received from the wireless transmission path 230, and the received signal is subjected to a downconverting process. As a result, the above-described baseband (uncompressed) video and audio data and the AVC Control/Message packet including the identification information SPF are obtained.

The baseband (uncompressed) image data obtained in the wireless transmitting/receiving unit 223 is supplied to the display unit 224. In the display unit 224, the image data supplied from the wireless transmitting/receiving unit 223 is processed, and visual image produced by the image data is displayed. The baseband (uncompressed) audio data obtained in the wireless transmitting/receiving unit 223 is supplied to a speaker (not shown), and audible sound produced by the audio data is outputted.

The AVC Control/Message packet including the identification information SPF, which is obtained in the wireless transmitting/receiving unit 223, is supplied to the controller 221. An operation in the display unit 224 is controlled based on the identification information SPF. That is, when the identification information SPF, i.e., the Operand, is in a state indicative of not a still picture content (reset SPF), the display unit 224 is controlled to receive the image data obtained in the wireless transmitting/receiving unit 223. In this case, the display unit 224 is in a refresh control state where a display is refreshed by each frame rate.

When the identification information SPF, i.e., the Operand, is in a state indicative of a still picture content (set SPF), the display unit 224 is controlled to stop receiving the image data obtained in the wireless transmitting/receiving unit 223. In this case, the display unit 224 is in the still control state where the image data held before stopping the reception is used to display.

In the source device 210, when the still picture content is reproduced in the reproducing unit 213, identical image data are repeatedly obtained from the reproducing unit 213 by each frame rate, and as described above, the identical image data are transmitted from the wireless transmitting/receiving unit 214 to the wireless transmission path 230. The transmission of the image data regarding the still picture content like this is stopped later when there is a confirmation response (response) of the identification information SPF indicative of the still picture content from the sink device 220. The confirmation response is performed by using the AVC Control/Message packet, as described above.

As described above, when the image data received in the wireless transmitting/receiving unit 223 is the image data of the still picture content, the sink device 220 stops receiving (refreshing) of the image data in a subsequent frame in which the identification information SPF in a state indicative of the still picture content is acquired, and a still picture display by the held image data is performed. Because of this, when the still picture content is reproduced in the reproducing unit 213, even if the transmission of the image data to the wireless transmission path 230 is stopped after there is the confirmation response (response) of the identification information SPF, a problem may not be found. When the transmission of the image data is stopped in this way, a futile bandwidth occupation is avoided, and an effective utilization of a finite transmission bandwidth is enabled.

In the source device 210, when the still picture content reproduced in the reproducing unit 213 is changed from a still picture content to another still picture content, the identification information SPF generated in the controller 211 is set to a state (reset SPF) indicative of not a still picture content, and after a predetermined time period, this state is changed to a state (set SPF) indicative of a still picture content.

As described above, when the image data received in the wireless transmitting/receiving unit 223 is the image data of the still picture content, the sink device 220 stops receiving (refreshing) of the image data in a subsequent frame in which the identification information SPF in a state indicative of the still picture content is acquired, and a still picture display by the held image data is performed.

Thus, when the still picture content is changed to another still picture content, if it is assumed that the identification information SPF transmitted together with the image data of the other still picture content is in a state indicative of a still picture content, the controller 221 of the sink device 220 recognizes that the identification information SPF remains in a state indicative of a still picture content, and the display unit 224 controlled by the controller 221 is caused to remain in a state where the reception of the image data is stopped. As a result, the image data of the other still picture content received by the wireless transmitting/receiving unit 223 is not received in the display unit 224.

When the state of the identification information SPF generated in the controller 211 of the source device 210 is changed as described above, the display unit 224 of the sink device 220 receives the image data of the other still picture content, and thereafter, the reception of the image data is stopped again. As a result, the display unit 224 is brought into a state where the held image data is used.

FIG. 10 shows one example of a control sequence between the source device 210 and the sink device 220.

(a) When the content reproduced in the reproducing unit 213 of the source device 210 is changed from the moving picture content to the still picture content SP1 according to the user operation.

(b) The image data of the still picture content SP1 is repeatedly outputted in a refresh cycle by a frame rate from the reproducing unit 213, and the outputted data is transmitted to the sink device 220.

(c) In response to the transmitting of the image data of the still picture content SP1, the AVC Control/Message packet including the identification information SPF in a state (set SPF) indicative of the still picture content is generated in the controller 211, and the AVC Control/Message packet is transmitted to the sink device 220.

(d) The display unit 224 of the sink device 220 firstly receives the image data of the still picture content SP1 transmitted from the source device 210. However, since the identification information SPF included in the AVC Control/Message packet transmitted from the source device 210 is in a state (set SPF) indicative of a still picture content, the display unit 224 stops receiving the image data later, and is moved to a still control state where a display is performed by using the held image data.

(e) When accepting the identification information SPF in a state (set SPF) indicative of a still picture content, the sink device 220 transmits to the source device 210 the AVC Control/Message packet indicating the confirmation response (response) to the accepting of the identification information SPF.

(f) After receiving the confirmation response from the sink device 220, the source device 210 stops reproducing the still picture content SP1 from the reproducing unit 213, and stops transmitting the image data of the still picture content SP1 to the sink device 220.

(g) Thereafter, when the content reproduced in the reproducing unit 213 of the source device 210 is changed from the still picture content SP1 to another still picture content SP2 in response to the user operation.

(h) The image data of the still picture content SP2 is outputted repeatedly in a refresh cycle by a frame rate from the reproducing unit 213 of the source device 210, and the outputted data is transmitted to the sink device 220.

(i) In response to the still picture content SP2, the AVC Control/Message packet including the identification information SPF in a state (reset SPF) indicative of not a still picture content is firstly generated from the controller 211, and the AVC Control/Message packet is transmitted to the sink device 220.

(j) As a result, the still control state of the display unit 224 of the sink device 220 is cancelled, and the display unit 224 receives the image data of the still picture content SP2 and is moved to the refresh control state where the display is refreshed by each frame rate.

(k) When accepting the identification information SPF in a state (reset SPF) indicative of not a still picture content, the sink device 220 transmits the AVC Control/Message packet indicating the confirmation response (response) to the source device 210.

(l) In the source device 210, after accepting the confirmation response from the sink device 220, the AVC Control/Message packet generated in the controller 211 is set to a packet which includes the identification information SPF in a state (set SPF) indicative of a still picture content, and the AVC Control/Message packet is transmitted to the sink device 220.

(m) Since the identification information SPF included in the AVC Control/Message packet transmitted from the source device 210 is in a state (set SPF) indicative of a still picture content, the display unit 224 of the sink device 220 stops the reception of the image data later and moves to the still control state where the display is performed by using the held image data.

(n) In the case of accepting the identification information SPF in a state (set SPF) indicative of the still picture content, the sink device 220 transmits the AVC Control/Message packet indicating the confirmation response (response) to the accepting to the source device 210.

(o) After receiving the confirmation response from the sink device 220, the source device 210 stops reproducing the still picture content SP2 from the reproducing unit 213, and stops transmitting the image data of the still picture content SP2 to the sink device 220.

As described above, in the communication system 200 shown in FIG. 8, upon transmitting of the baseband (uncompressed) image data of a content from the source device 210 to the sink device 220, the AVC Control/Message packet including the identification information SPF in a state (set SPF) indicative of a still picture content is transmitted in response to the transmitting of the image data from the source device 210 to the sink device 220.

As a result, in the sink device 220, the controller 221 identifies whether the transmitted image data is an image data of a still picture content based on the identification information SPF. When the image data is an image data of a still picture content, the display unit 224 stops receiving the image data under the control of the controller 221, and then, the display unit 224 is moved to the still control state where the display is performed by using the held image data.

When there is the confirmation response of the identification information SPF indicative of the still picture content from the sink device 220, the source device 210 stops reproducing the still picture content from the reproducing unit 213 and stops transmitting the image data of the still picture content to the sink device 220. Thus, it becomes possible to avoid a futile bandwidth occupation generated by re-transmitting of the image data of the still picture content, so that a finite transmission bandwidth may be effectively utilized.

The above-described embodiment shows a case where the video signal processor of the receiver is the display unit 154 or 224 (see FIG. 1 and FIG. 8). However, the present invention may be similarly applicable to a case where the video signal processor of the receiver is a unit for performing another process such as a recording unit where a received video signal is recorded.

The above-described embodiment shows a case where the identification information SPF indicating whether the baseband (uncompressed) video signal (image data) transmitted from the transmitter to the receiver is a still picture content is transmitted by utilizing the AVI InfoFrame packet located in the blanking period of the video signal, or by utilizing the AVC Control/Message packet. However, it is needless to say that means for transmitting the identification information SPF is not limited thereto.

According to embodiments of the present invention, upon wirelessly transmitting an uncompressed video signal of a predetermined content, identification information for identifying whether the predetermined content is a still picture content is further transmitted, so that a futile bandwidth occupation may be avoided and a finite transmission bandwidth may be effectively utilized.

Embodiments of the present invention are capable of avoiding a futile bandwidth occupation and effectively utilizing a finite transmission bandwidth, and are applicable to a communication system in which a baseband (uncompressed) video signal of content is wirelessly transmitted from a transmitter to a receiver.

It should be understood by those skilled in the art that various modifications, combinations, sub-combinations and alternations may occur depending on design requirements and other factors insofar as they are within the scope of the appended claims or equivalents thereof.

What is claimed is:
1. A communication system comprising:
a transmitter including:
a video signal outputting unit outputs a video signal of a predetermined content,
an identification information generating unit generates identification information for identifying whether the predetermined content is a still picture content, and
a transmitting unit transmits wirelessly the video signal outputted from the video signal outputting unit and the identification information generated in the identification information generating unit to the receiver; and
a receiver including:
a receiving unit receives the video signal and the identification information transmitted wirelessly from the transmitter,
a video signal processor processes the video signal received in the receiving unit, and
a controller controls an operation of the video signal processor based on the identification information received in the receiving unit,
wherein the identification information for identifying whether the predetermined content is a still picture content is included as a binary flag that is transmitted for each frame of the video signal as part of auxiliary video information for the frame, and
wherein when the identification information for a frame of the video signal indicates that the predetermined content is a still picture content, the receiver of the video signal stops refreshing display of the predetermined content for frames subsequent to the frame corresponding to the still picture content indication.

2. A method for transmitting video signal, the method comprising the steps of:
- transmitting wirelessly a video signal of a predetermined content from a transmitter to a receiver; and
- transmitting identification information from the transmitter to the receiver synchronously with the video signal or asynchronously with the video signal, the identification information being for identifying whether the predetermined content is a still picture content,
- wherein the identification information for identifying whether the predetermined content is a still picture content is included as a binary flag that is transmitted for each frame of the video signal as part of auxiliary video information for the frame, and
- wherein when the identification information for a frame of the video signal indicates that the predetermined content is a still picture content, the receiver of the video signal stops refreshing display of the predetermined content for frames subsequent to the frame corresponding to the still picture content indication.

3. A transmitter comprising:
- a video signal outputting unit outputs a video signal of a predetermined content;
- an identification information generating unit generates identification information for identifying whether the predetermined content is a still picture content; and
- a transmitting unit transmits the video signal outputted from the video signal outputting unit and the identification information generated in the identification information generating unit to a wireless transmission path,
- wherein the identification information for identifying whether the predetermined content is a still picture content is included as a binary flag that is transmitted for each frame of the video signal as part of auxiliary video information for the frame, and
- wherein when the identification information for a frame of the video signal indicates that the predetermined content is a still picture content, a receiver of the video signal stops refreshing display of the predetermined content for frames subsequent to the frame corresponding to the still picture content indication.

4. The transmitter according to claim 3, wherein the transmitting unit transmits the identification information to the wireless transmission path synchronously with the video signal.

5. The transmitter according to claim 4, wherein the transmitting unit transmits the identification information, in a state of being inserted in a blanking period of the video signal, to the wireless transmission path.

6. The transmitter according to claim 3, wherein the transmitting unit transmits the identification information to the wireless transmission path asynchronously with the video signal.

7. The transmitter according to claim 3, wherein:
- a source device and a wireless transmitter are provided, the source device including the video signal outputting unit and the identification information generating unit, and the wireless transmitter including the transmitting unit, and
- the source device and the wireless transmitter are connected by wire.

8. The transmitter according to claim 7, wherein the source device transmits the video signal in which the identification information is inserted in a blanking period to the wireless transmitter by a differential signal through a plurality of channels.

9. The transmitter according to claim 3, wherein:
- when the video signal outputted from the video signal outputting unit is a video signal related to still picture content,
- the transmitting unit transmits the video signal and the identification information to the wireless transmission path only for a predetermined time period.

10. The transmitter according to claim 3, wherein:
- when the video signal outputted from the video signal outputting unit is a video signal related to a still picture content,
- the transmitting unit stops the transmission of the video signal and the identification information to the wireless transmission path in response to a confirmation response of the identification information from a receiving side.

11. The transmitter according to claim 3, wherein:
- when the video signal outputted from the video signal outputting unit is changed from a video signal related to one still picture content to a video signal related to another still picture content,
- the identification information generating unit sets the generated identification information to a first state indicative of not a still picture content, and after a predetermined time period, changes to the first state to a second state indicative of a still picture content.

12. A transmitting method comprising:
- outputting a video signal of a predetermined content;
- generating identification information for identifying whether the predetermined content is a still picture content; and
- transmitting the video signal outputted at the video signal outputting step and the identification information generated at the identification information generating step to a wireless transmission path,
- wherein the identification information for identifying whether the predetermined content is a still picture content is included as a binary flag that is transmitted for each frame of the video signal as part of auxiliary video information for the frame, and
- wherein when the identification information for a frame of the video signal indicates that the predetermined content is a still picture content, a receiver of the video signal stops refreshing display of the predetermined content for frames subsequent to the frame corresponding to the still picture content indication.

13. A receiver comprising:
- a receiving unit receives a video signal and identification information which are transmitted by a wireless transmission path, the video signal being a video signal of a predetermined content and the identification information identifying whether the predetermined content is a still picture content, transmitted by a wireless transmission path;
- a video signal processor processes the video signal received in the receiving unit; and
- a controller controls an operation of the video signal processor based on the identification information received in the receiving unit,
- wherein the identification information for identifying whether the predetermined content is a still picture content is included as a binary flag that is transmitted for each frame of the video signal as part of auxiliary video information for the frame, and wherein when the identification information for a frame of the video signal indicates that the predetermined content is a still picture content, the receiver of the video signal stops refreshing display of the predetermined content for frames subsequent to the frame corresponding to the still picture content indication.

14. The receiver according to claim 13, wherein:
a wireless receiver and a sink device are provided, the wireless received including the receiving unit and the sink device including the video signal processor, and
the wireless receiver and the sink device are connected by wire.

15. The receiver according to claim 14, wherein the wireless receiver transmits the video signal in which the identification information is inserted in a blanking period to the sink device by a differential signal through a plurality of channels.

16. The receiver according to claim 13, wherein:
when the identification information received in the receiving unit is in a state indicative of not a still picture content, the controller controls the video signal processor to receive the video signal received in the receiving unit; and
when the identification information received in the receiving unit is in a state indicative of a still picture content, the controller controls the video signal processor to stop receiving the video signal received in the receiving unit.

17. A receiving method, comprising the steps of:
receiving a video signal and identification information transmitted by a wireless transmission path, the video signal being a compressed video signal of a predetermined content, and the identification information identifying whether the predetermined content is a still picture content;
processing the video signal received at the receiving step; and
controlling an operation of the video signal processing step based on the identification information received at the receiving step,
wherein the identification information for identifying whether the predetermined content is a still picture content is included as a binary flag that is transmitted for each frame of the video signal as part of auxiliary video information for the frame, and
wherein when the identification information for a frame of the video signal indicates that the predetermined content is a still picture content, a receiver of the video signal stops refreshing display of the predetermined content for frames subsequent to the frame corresponding to the still picture content indication.

* * * * *